United States Patent
Ambiger et al.

(10) Patent No.: US 9,971,653 B1
(45) Date of Patent: May 15, 2018

(54) METHODS AND APPARATUS FOR ON DEMAND BACKUP INTERFACE

(71) Applicant: EMC Corporation, Hopkinton, MA (US)

(72) Inventors: Siddappa Ambiger, Bangalore (IN); Mahantesh Ambaljeri, Bangalore (IN); Amith Ramachandran, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 812 days.

(21) Appl. No.: 14/139,572

(22) Filed: Dec. 23, 2013

(51) Int. Cl.
*G06F 11/14* (2006.01)
*G06F 17/30* (2006.01)

(52) U.S. Cl.
CPC ...... *G06F 11/1451* (2013.01); *G06F 11/1446* (2013.01); *G06F 11/1448* (2013.01); *G06F 17/30076* (2013.01)

(58) Field of Classification Search
CPC ........................ G06F 17/30073; G06F 11/1448
See application file for complete search history.

(56) References Cited

U.S. PATENT DOCUMENTS

| | | | | |
|---|---|---|---|---|
| 7,676,689 B1 * | 3/2010 | Shioyama | ........... | G06F 11/1469 714/6.12 |
| 7,716,435 B1 * | 5/2010 | Allen | ................. | G06F 11/1458 711/154 |
| 8,868,503 B1 * | 10/2014 | Ravichandran | ... | G06F 17/30088 707/639 |
| 9,026,498 B2 * | 5/2015 | Kumarasamy | .... | G06F 17/30079 707/652 |
| 9,069,885 B1 * | 6/2015 | Moeller | .............. | G06F 11/1448 |
| 2004/0260973 A1 * | 12/2004 | Michelman | ......... | G06F 11/1458 714/13 |
| 2005/0228836 A1 * | 10/2005 | Bacastow | ........... | G06F 11/1451 |
| 2008/0034016 A1 * | 2/2008 | Cisler | ................. | G06F 11/1466 |
| 2010/0070725 A1 * | 3/2010 | Prahlad | .............. | G06F 11/1453 711/162 |
| 2011/0087874 A1 * | 4/2011 | Timashev | ........... | G06F 9/44589 713/100 |
| 2012/0102088 A1 * | 4/2012 | Bindal | ................ | G06F 11/1461 709/203 |
| 2014/0122437 A1 * | 5/2014 | Bosson | ............... | G06F 11/1458 707/652 |

* cited by examiner

*Primary Examiner* — Grace Park
*Assistant Examiner* — Jessica N Le
(74) *Attorney, Agent, or Firm* — Womble Bond Dickinson (US) LLP (57) ABSTRACT

Methods and apparatuses that present a list of graphic elements representing files stored in a device storing a cart data specifying a file collection among the files to be backed up to a backup service are described. The application may be activated to perform processing operations on selected files via the presented list. A list of interface options having edit menus to update the file collection may be presented in response to receiving a first user input while the application is still active. The selected files may be added to the file collection in response to receiving a second user input via a first menu of the edit menus. The application may be reactivated after the selected files are added to the file collection. Subsequently, on demand backup operations may be initiated to copy files specified in the file collection in response to receiving a user input.

23 Claims, 8 Drawing Sheets

Presenting a list of graphic elements representing hierarchical relationships of files stored in a device remotely coupled to a backup service for the device, each graphic element corresponding to one or more of the files, the device storing a cart data specifying a file collection among the files, the file collection to be backed up to the backup service, the graphic elements displayed at a foreground of a display device 301

Activating an application to perform processing operations on corresponding one or more files of one of the graphic elements, the processing operations independent of the backup service, the application presenting a user interface at the foreground for the processing operations 303

Presenting a list of interface options at the foreground in response to receiving a first user input selecting the one graphic element while the application is still activated for the processing operations, the list having one or more edit menus to update the file collection of the cart data, the edit menus including a first menu 305

Adding the corresponding files of the selected graphic element to the file collection of the cart data in response to receiving a second user input on the first menu, while the application is still activated for the processing operations 307

Presenting the user interface of the application at the foreground to continue the processing operations in response to receiving a third user input subsequent to the second user input 309

Initiating on demand backup operations to copy one or more files specified in the file collection to the backup service in response to receiving a fourth user input subsequent to the third user input, 311

METHODS AND APPARATUS FOR ON DEMAND BACKUP INTERFACE

FIELD OF THE INVENTION

Embodiments of the present invention relate generally to backup operations for data storage systems. More particularly, embodiments of the invention relate to the user interface used to perform on demand backup operations for data storage systems.

BACKGROUND

Back up services typically allow a client device to request back up operations on demand to copy certain data from the client device to backup storages in addition to scheduled backup operations. Typically, a user of the client device is required to start a particular backup application providing a user interface to select which files to back up. For example, the user may need to traverse a file system tree of the device via the user interface before triggering the backup operations.

Often times, a user of the client device can interact with certain tasks or applications when certain data files are identified for immediate backup. These tasks may not be related to backup services. As a result, starting the particular backup application for on demand backup operations may require the user to interrupt current active tasks. Further, waiting for backup operations to complete may cause additional delays from switching back to the user's current tasks.

Thus, traditional interfaces to trigger on demand backup operations may require a user to pause from current work, conducting file system traversing, and/or waiting for immediate backup operations to complete.

BRIEF DESCRIPTION OF THE DRAWINGS

Embodiments of the invention are illustrated by way of example and not limitation in the figures of the accompanying drawings in which like references indicate similar elements.

FIG. 3 is a flow diagram illustrating one embodiment of a process to initiate on demand backup operations according to one embodiment of the invention;

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In one embodiment, a single click user interface may be provided for managing on demand backup operations while a user is performing a task via an application without requiring the user to pause the current task. A single click interface may be based on, for example, a mouse click (e.g. right click) when a file or files are selected. In some embodiments, a single click based interface may be applicable to initiate both on demand and scheduled backup operations. A client device may be configured/updated with a single click interface capability automatically when registered, enrolled or authorized with a backup service system, such as system 100 of FIG. 1.

In one embodiment, cart data based on demand backup capability may be provided as an easy user interface option to trigger multiple file/folder backup (on demand or scheduled) to in a client of a backup service. A user can perform the backup of a file in a single click. In one embodiment, a cart (or bucket) data may represent a virtual cart where a user can add/remove files/folders to be backed up. The cart data may be based on a particular configuration file including locations of files/folders specified by a client user to be backed up on demand. When receiving an initiation instruction (e.g. via a single click) by the user, on demand backup operations may be performed immediately (or scheduled immediately for earliest available processing time slot in a client device) to back up files present in the cart data.

Cart data may be edited by a user, for example, via single click user interface. In one embodiment, file locations specified in the cart data may be added to or removed (deleted) from the cart data. In one embodiment, a single click user interface may allow a user to empty the cart data (e.g. to delete all entries in the cart data).

A client facility/feature for a backup service in a client device may provide a single click user interface to trigger backup operations via cart data. A user may instruct the client device, e.g. via one single click, to add folder/files into the cart data during activities using the client device to perform a variety of tasks, e.g. not related to data back. At a later time, the user may initiate execution of backup operations, e.g. via one single click, to copy files/directories specified in the cart data to remote data storages, such as storage units 108, 109 of FIG. 1. Alternatively or optionally, the user can schedule or reschedule on demand backup operations for files/directories specified in the cart data.

On demand and/or scheduled backup operations to protect a file system in a client device may be performed based on cart data without a need to launch a specific application dedicated with providing a user interface to manage backup operations. Multiple files/folders may be specified in the cart data. A user may update the cart data via simple user interface actions (e.g. clicks) to ensure certain file(s) are to be backed up without a need to pause or interrupt a current task or application to activate the specific application for backup operations.

In one embodiment, user interface options for cart data can be provided in popup options, e.g. via drop down menus or menu items etc., when graphic elements representing files/folders are selected with mouse clicks (e.g. right click). A user may just select a target file/folder to back up using these user interface options to add the target file/folder in to the cart data for triggering the backup operations on demand (e.g. immediately or at later time).

In some embodiments, cart data based on demand backup interface may be installed and/or configured to a client device from a central backup server to enable single click options to trigger on demand backup operations. For example, the installation may cause a software agent running as a background process in the client device to support cart data based on demand backup interface. The agent may include, for example, on demand backup handler module 207 of FIG. 2.

When a user is in the middle of performing processing tasks using the client device, certain files/folders may be identified by the user for backup protection (e.g. including data important to the user). The user may select the identified files/folders for backup via simple right click user inputs for cart data backup options without launching another application to bring up user interfaces for backup operations. Simple user inputs, such as right click actions, for cart data based backup operations may be received and processed using much lighter processing resources compared with launching another application for backup operations. The user may add multiple files/folders to the cart data at different times while performing different activities using the client device without being interrupted by, for example, either launching special backup applications and/or performing actual data backup operations.

In one embodiment, when the user is ready to perform the backup operations, a special application may be launched to trigger on demand backup operations against data specified in the cart data. Alternatively or optionally, a right click on a graphic element (e.g. in task window) indicating an agent running in the background for the backup service may bring up an option to trigger backup operations based on the cart data. In some embodiments, a backup user interface option (e.g. popup or drop down menu) based on the cart data may be provided whenever a user right click is received in the client device. According to certain embodiments, command line options may be provided to specify and/or trigger on demand backup operations in addition to single click based GUI options.

Figure 1:
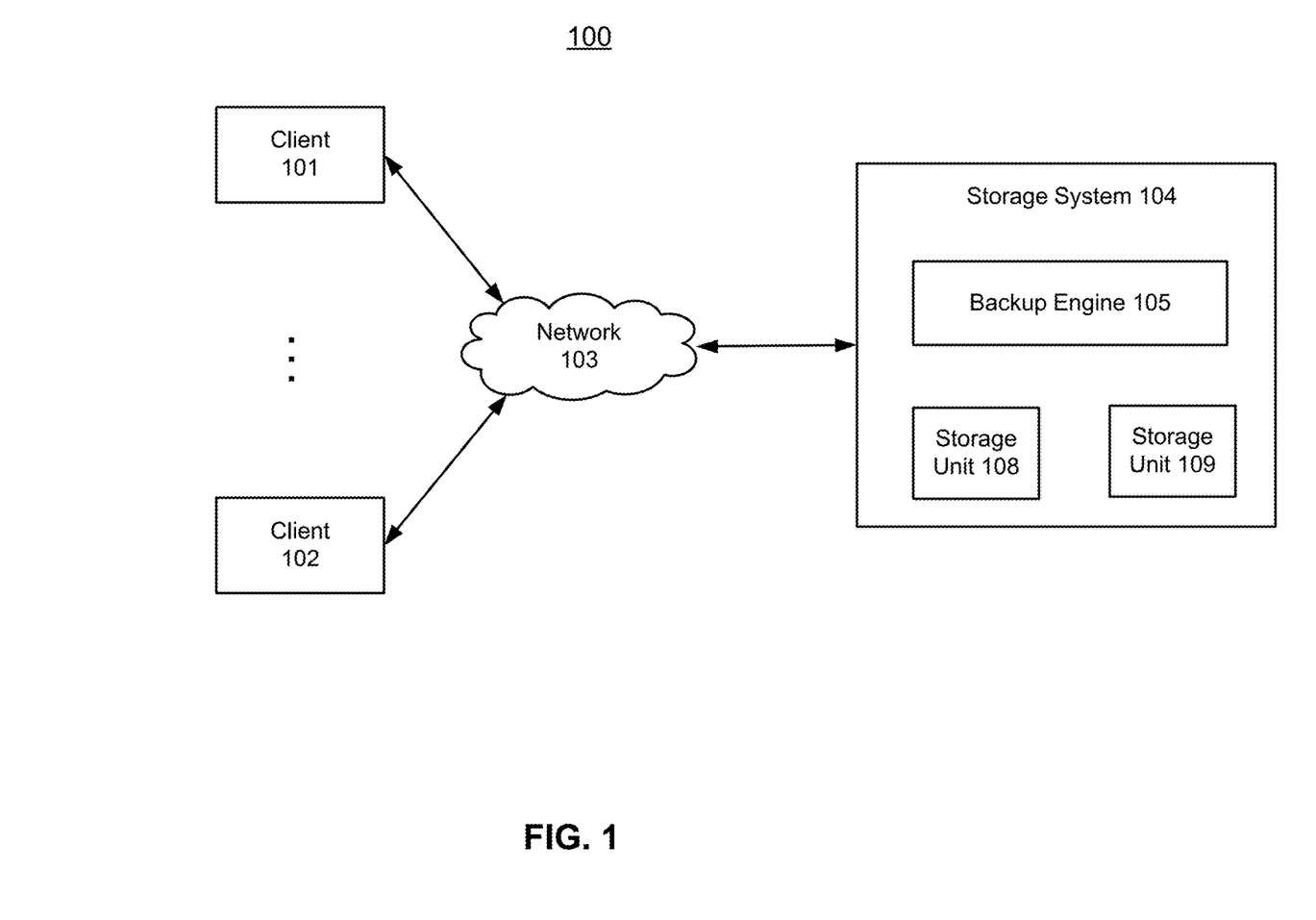
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of clients 101-102 may be a primary storage system that provides storage to other local clients, which may periodically back up the content stored therein to a backup storage system, such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include any type of server or cluster of servers to provide backup services. For example, storage system 104 may be a storage server used for any of various different purposes, such as to provide multiple users with access to shared data and/or to back up data (e.g., mission critical data). In one embodiment, storage system 104 includes, but is not limited to, backup engine 105, and one or more storage units 108-109 communicatively coupled to each other. Backup engine 105 may include a storage engine to segment backup data. Storage units 108-109 may be implemented locally (e.g., single node operating environment) or remotely (e.g., multi-node operating environment) via interconnect, which may be a bus and/or a network (e.g., a storage network or a network similar to network 103). Storage units 108-109 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In response to a data file to be stored in storage units 108-109, backup engine 105 may segment the data file into multiple chunks (also referred to as segments) according to a variety of segmentation policies or rules via a storage engine. A chunk may not be stored in a storage unit if the chunk has been previously stored in the storage unit. In the event that a chunk is not to be stored, metadata of the chunk may be stored instead to enable the reconstruction of the file using the previously stored chunk. As a result, chunks of data files are stored in a deduplicated manner, either within each of storage units 108-109 or across at least some of storage units 108-109.

In one embodiment, storage system 104 may provide efficient backup and recovery through a complete software and hardware solution. Storage system 104 may be based on integrated variable-length deduplication capabilities to facilitate fast, daily full backups for virtual environments, remote offices, enterprise applications, network-attached storage (NAS) servers, and desktops/laptops. The variable-length deduplication may significantly reduce backup time by only storing unique daily changes while maintaining daily full backups for immediate, single-step restore.

Deduplicated backup capabilities may allow system 100 to copy only changed data blocks for backup operations to reduce network traffic. Thus, existing local area network (LAN) and wide area network (WAN) bandwidth may be leveraged for enterprise wide and remote/branch office backup and recovery without a need for additional network infrastructure. Each backup operation may be performed to ensure a full backup to allow a client user to browse, point, and click for a single-step recovery.

Figure 2:
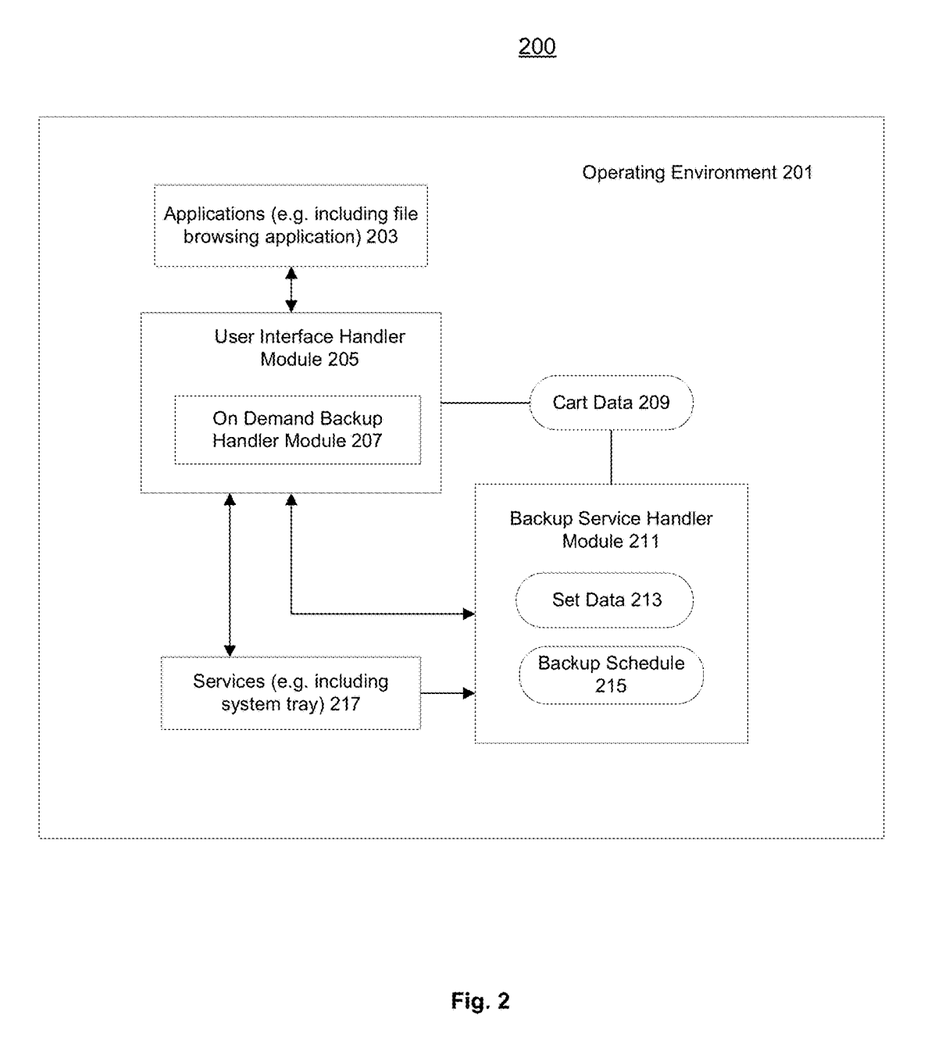
FIG. 2 is a block diagram illustrating system components for on demand backup interface according to one embodiment of the invention.

FIG. 2 is a block diagram illustrating system components for an on demand backup interface according to one embodiment of the invention. For example, system 200 may be hosted in client 101 and/or client 102 of FIG. 1. Operating environment 201, such as an operating system running in a client device, such as client 101 of FIG. 1, may include applications 203 capable of interactions with a user via user interface handler module 205. Applications 203 may include a file browser application to allow a user to explore, for example, file/directory structures of system 200 via a graphical user interface presented on a display device.

Operating environment 201 may provide services 217, such as a system tray interface, at a system level independent of third party applications, such as in applications 203. In some embodiments, a user interface presented in a display device for operation environment 201 may be partitioned into at least a system area and an application area separately and/or non-overlapping. User interfaces for applications 203 may be presented within the application area and user interfaces for services 217 may be presented within the system area (e.g. a system tray interface).

In one embodiment, operating environment 201 may include backup service handler module 211 to perform backup operations to copy local data or files to remotely or network coupled storage devices, such as storage unit 108, 109 of FIG. 1. Backup service handler module 211 may be configured (e.g. remotely from a system administration of a backup service, such as system 100 of FIG. 1) with set data (or data set) 213 and backup schedule 215. Set data 213 may specify which local data of system 200 (e.g. files/directories) are to be backed up according to backup schedule 215.

In one embodiment, backup service handler module 211 may be capable of performing on demand backup operations according to cart data 209 on user's request (e.g. immediately) independent of backup schedule 215. User interface handler module 205 may be installed with on demand backup handler module 207 to allow applications 203 to specify/manage which files/directories are to be backed up (or copied) when next on demand backup operations are initiated. On demand backup operations for the current data specified in cart data 209 may be started when needed via user instructions received via user interface handler module 205.

FIG. 3 is a flow diagram illustrating one embodiment of a process to initiate on demand backup operations according to one embodiment of the invention. Exemplary process 300 may be performed by a processing logic that may include hardware (circuitry, dedicated logic, etc.), software (such as is run on a dedicated machine), or a combination of both. For example, process 300 may be performed by some components of system 200 of FIG. 2. At block 301, for example, the processing logic of process 300 may present a list of graphic elements representing a hierarchical relationships of files stored in a device remotely coupled to a backup service, such as system 104 of FIG. 1, for a device. Each graphic element may correspond to a file, a directory or other applicable combination of data or files in a system of the device. The graphic elements may be displayed on the foreground of a display device, such as a display screen coupled to the client device to interact with a user. For example, the graphic elements may correspond to a file or directory browsing user interface presented by a file browsing application. The list of graphic elements can correspond to a directory structure with the hierarchical relationship for the files. The selected graphic element can correspond to a directory in the directory structure.

In one embodiment, the device can store cart data, such as cart data 209 of FIG. 2, specifying a file collection among files stored in the device. The file collection may be backed up to the backup service to be duplicated or copied for data protection. One or more applications may be activated or running on the device to perform processing operations on one or more files (e.g. a directory) corresponding to one of the graphic elements. These processing operations may be performed for certain processing tasks (e.g. word processor, database queries, web browsing, communication messages, etc.) independent of the backup service.

The processing logic of process 300 can present a list of user interface items, a dropdown menu or other applicable user interface components, such as a button, list, etc., at the foreground of a display screen in response to receiving a first user input at block 305. A graphic element may be selected according to the first user input while the application is still activated for the processing operations. The list of user interface items can have one or more edit menu items or other applicable user interface items, to update the file collection of the cart data.

A user input may be based on a user click operation detected via an input/output device locally coupled to the device. The user click operation can cause an event received in the browsing application which is activated independent of the backup service. For example, the browsing application may be a file/directory browser for selecting a document file to activate a document processing application to edit the document file.

In one embodiment, at block 307, the processing logic of process 300 can add the corresponding files of the selected graphic element to the file collection of the cart data in response to receiving a second user input on a first menu item of the list of user interface items. The application may still be actively running to perform processing tasks independent of data backup operations when the second user input is received from the user. The user may have temporarily switched attention from the applications to a file browsing application associated with these graphic elements.

At block 309, the processing logic of process 300 can present the user interface of the application unrelated to data backup service at the foreground of a graphic display device to continue the processing operations in response to receiving a third user input subsequent to the second user input. For example, the user may tap (e.g. third user input) on a window belonging to the application to make the application currently active for the client device.

At block 311, the processing logic of process 300 can initiate on demand backup operations to copy one or more files specified in the file collection to the backup service in response to receiving a fourth user input (e.g. a mouse click) subsequent to the third user input. For example, the user may have completed the data processing tasks via these application and invoke a user interface to start backup operations on demand. The menu items for on demand operations can include an activation command option or menu item and the fourth user input may be received via the activation menu item for the initiation of the on demand backup operations.

In some embodiments, the display device can include a display area partitioned into at least one application area and one system area not overlapping with the application area. The graphic elements representing files/directories may be presented in the application area. The system area may include user interface elements associated with system services or system level applications. The first user input selecting a graphic element representing a file/directory may be received via the application area. Applications may be closed or activated in the application area(s) without affecting user interface elements displayed in the system area. In one embodiment, a system tray may be presented in the system area for a backup operation interface. A user click (e.g. the fourth user input) may be received via the system tray to initiate the on demand backup operations.

According to one embodiment, the initiation of the on demand backup operations may automatically add the corresponding files of the selected graphic element (e.g. of the browsing application, a current application, a document processing application or other applicable application) to the file collection of the cart data. As a result, the corresponding files of the selected graphic element may be copied to back up storages via the on demand backup operations. The file collection of the cart data may include a separate file in a separate directory of the directory structure other than the directory corresponding to the selected graphic element.

In some embodiments, the processing logic of process 300 can close the browsing application in response to receiving a fifth user input prior to the third user input. The fifth user input may be a tap on a close button to close the browsing application after the cart data has been updated to include target backup files. The browsing application may be closed to provide more screen real estate for the user to interact with the client device.

In one embodiment, the backup service can include a configuration server to remotely configure a client device for on demand backup operations. For example, the browsing application may be installed to the client device with single click interface for on demand backup operations during the configuration. In some embodiments, the browsing application may have been installed in the client device prior to the configuration. The configuration server may update the browsing application during the configuration, for example, via an updated user interface library including the menu items for on demand backup operations.

The processing logic of process 300 may reactivate the browsing application in response to receiving a sixth user input, e.g. via a tap to a system menu item associated with the browsing application. The sixth user input may be received prior to the third user input which causes the browsing application to become the current active application (e.g. presented at the foreground of the display screen). The processing logic of process 300 can present an updated list of graphic elements representing updated hierarchical relationships of latest files stored in the device via the reactivated browser application.

In some embodiments, the processing logic of process 300 can present the list of user interface items for on demand backup operations at the foreground in response to receiving a seventh user input (e.g. a mouse click) selecting a first one of the updated list of graphic elements corresponding to first one or more files. The processing logic of process 300 can update the cart data to add the first one or more files corresponding to the first one of the updated list of graphic elements selected in response to receiving an eighth user input (e.g. a mouse click) on the first menu item of the list of user interface items. The collection of files in the cart data for the on demand backup operations can include files added during different sessions (e.g. activations) of the browsing application.

In one embodiment, the list of user interface items or a drop down menu may be associated with edit menu items for editing the file collection of the cart data. For example, the edit menu items can include a second menu item to remove the corresponding files of a selected graphic element from the file collection of the cart data. Alternatively or optionally, the edit menu items include a third menu item to clear the file collection of the cart data.

Figure 4:
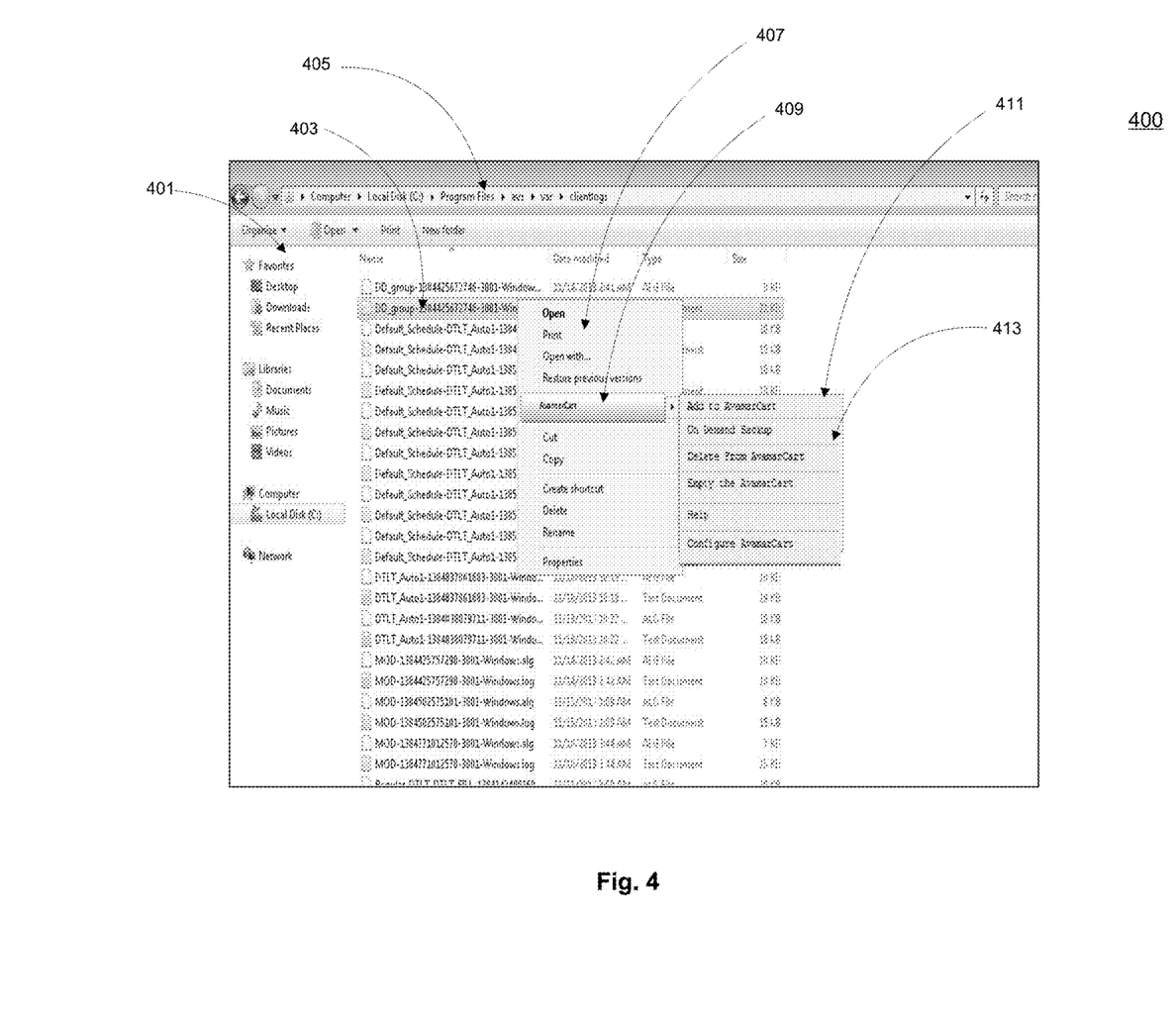
FIG. 4 is a sample diagram illustrating an exemplary user interface for on demand backup operations according to one embodiment of the invention.

FIG. 4 is a sample diagram illustrating an exemplary user interface for on demand backup operations according to one embodiment of the invention. For example, interface 400 may be presented via an input/output device of system 200 of FIG. 2. In one embodiment, interface 400 may provide a user interface for a file browsing application not related to backup operations. In one embodiment, field 405 may indicate a directory path or a resource locator path, e.g. "C:\Program Files\avs\var\clientlogs" of a currently selected file element 403. Column 401 may indicate hierarchical or grouping structures of data or files/directories in a system.

Drop down menu 407 may represent a list of user interface items presented when a user input (e.g. via mouse right click) is received for backing up selected file element 403. Drop down menu 407 may include menu item 409 for backup services. In one embodiment, a generic file browsing application may be updated with menu item 409 after installation of an on demand backup service from a backup server. Drop down menu 411 may be presented for menu item 409 for actions related to editing the cart data and initiating on demand backup operations. A user may right click on file element 403 and click on menu item 409 then menu item 413 to initiate on demand backup operations.

Figure 5A:
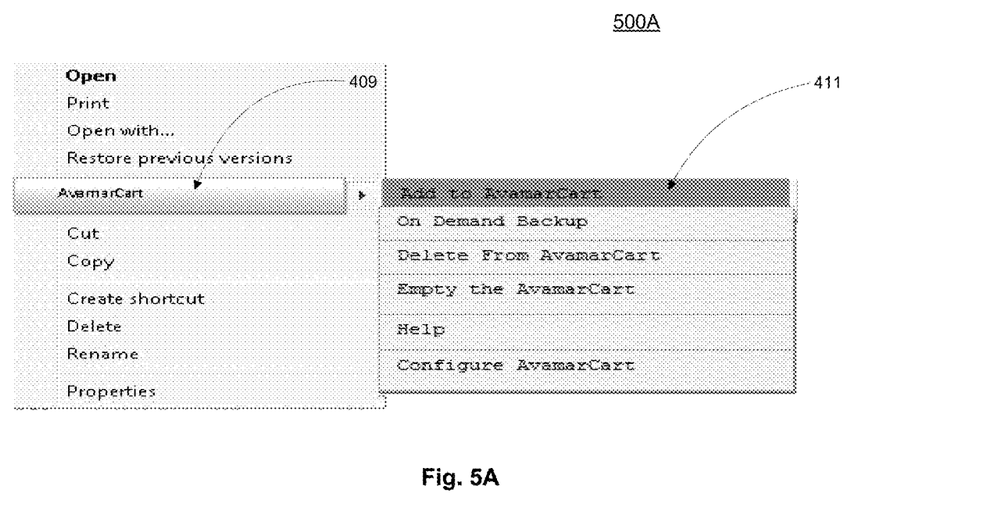
FIGS. 5A-5F are sample diagrams illustrating exemplary user interfaces to manage on demand backup operations according to one embodiment of the invention.

FIGS. 5A-5F are sample diagrams illustrating exemplary user interfaces to manage on demand backup operations according to one embodiment of the invention. For example, illustrations 500A-500F may be based on interface 400 of FIG. 4. Turning now to FIG. 5A, menu item 411 may provide an interface to add an additional file/directory to a cart data. A user can right click on graphic elements representing files to be selected, select menu item (or option) 409, then click on menu item 411 to cause currently selected files/directories to be added to a cart data, e.g. stored in a configuration file. A user can traverse to the next files/folders to add more files to be backed up via menu item 411. As a result, the cart data may specify more than one file which are dispersed at different folder locations.

Figure 5B:
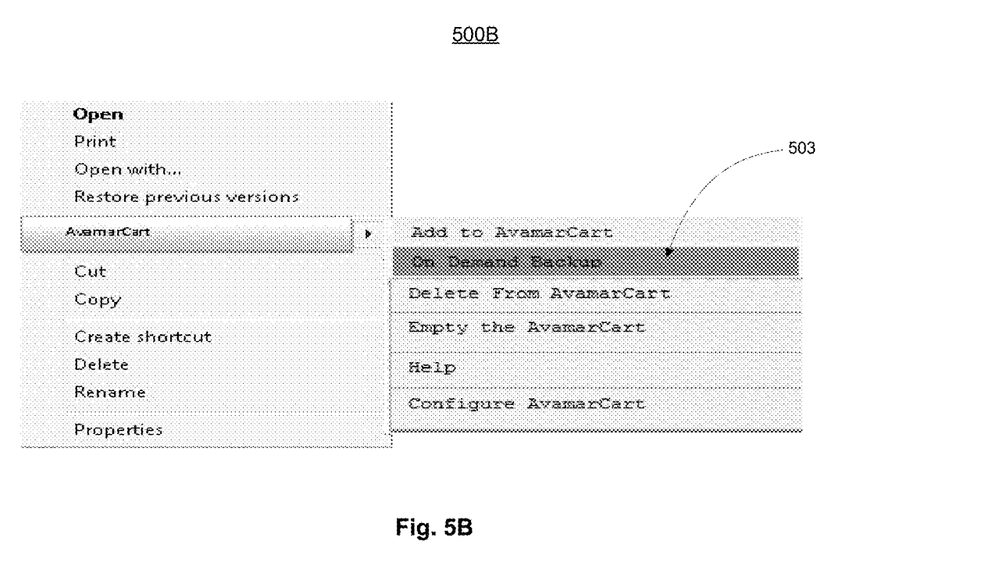

Turning now to FIG. 5B, menu item 503 may provide an interface to initiate on demand backup operations. For example, if a user wants to take a backup of a file/folder immediately while in the middle of some work (e.g. not related to backup service or operations), the user can right click on the graphic element representing the file/folder then select and click menu item 503 to initiate the immediate backup operations.

Figure 5C:
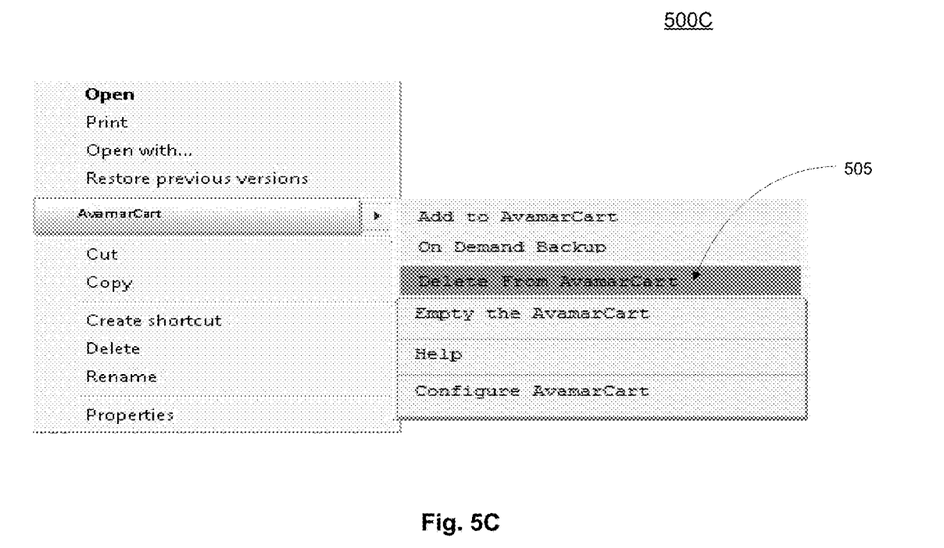

Turning now to FIG. 5C, menu item 505 may provide an interface to edit the cart data. For example, if a user wants to delete some items (e.g. files/folders) specified in the cart data, the user can right click on a graphic element representing a file/folder selection, then select and click menu item 505 to delete selected file/folder from the cart data.

Figure 5D:
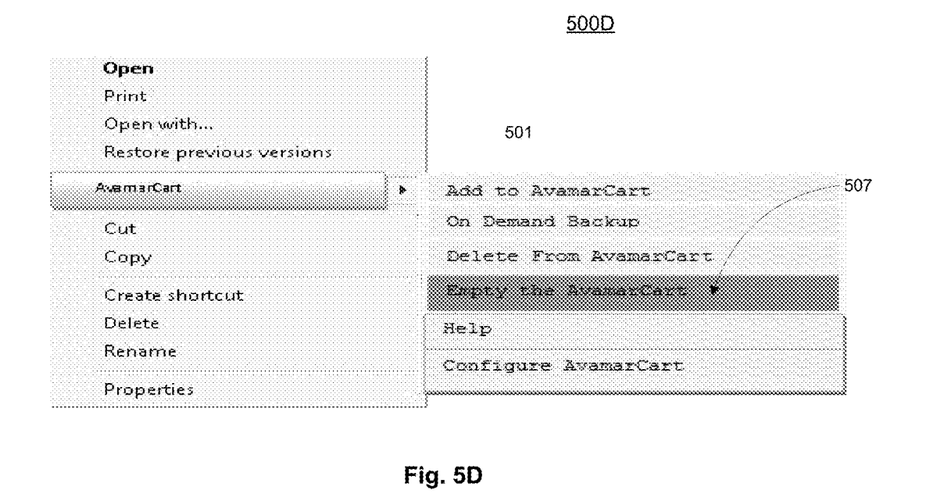
Figure 5E:
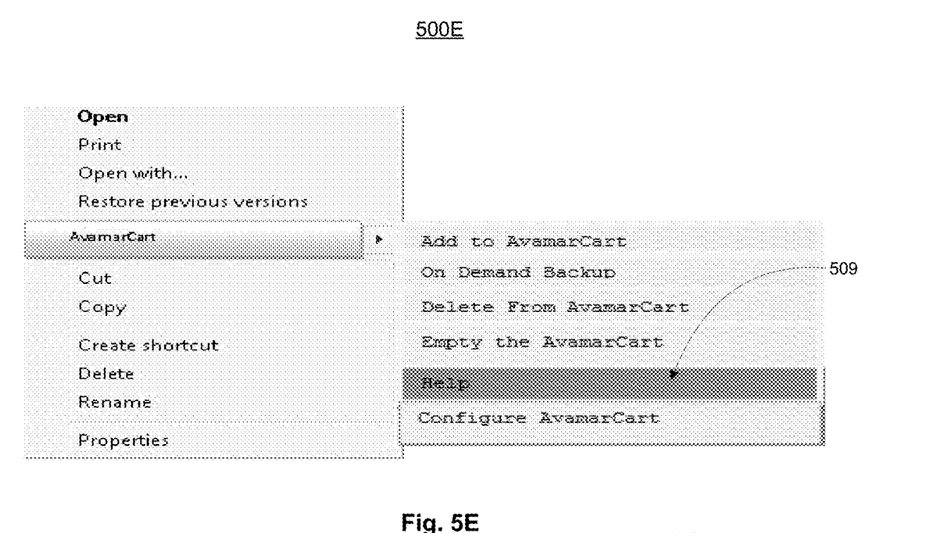
Figure 5F:
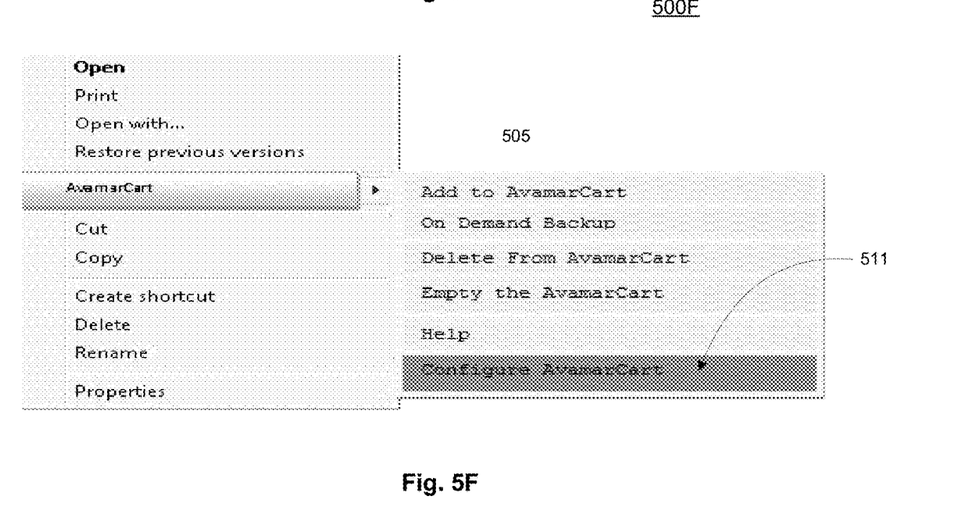

Turning now to FIG. 5D, menu item 507 may provide an interface to edit the cart data. For example, if a user does not want to take any of the files/folders added into the cart data, the user can select and click menu item 507 to clear contents of the cart data. In FIG. 5E, menu item 509 may provide an interface to access help content for operating on demand backup operations. In FIG. 5F, menu item 511 can provide an interface for an administrator (or a user with administration privileges) to configure the cart data.

Figure 6:
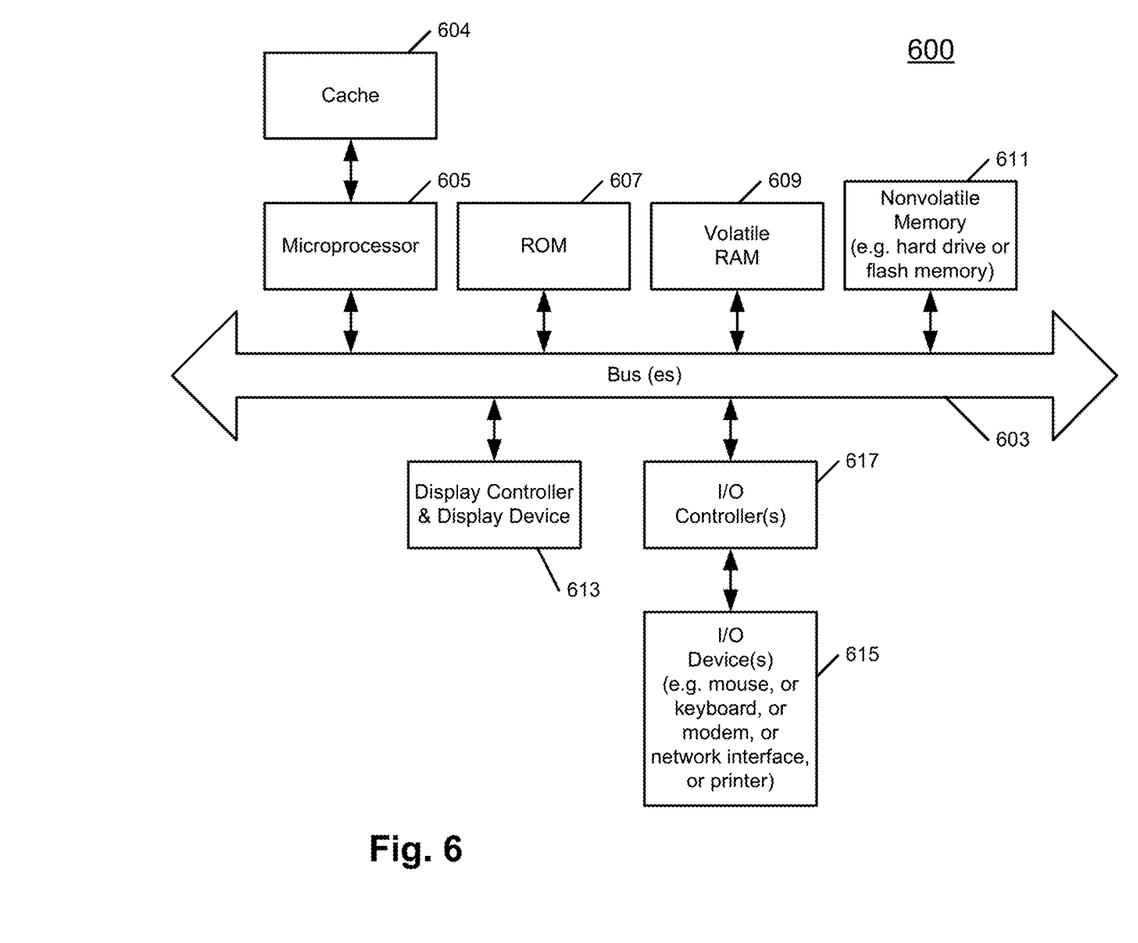
FIG. 6 illustrates one example of a typical computer system which may be used in conjunction with the embodiments described herein.

FIG. 6 shows one example of a computer system which may be used with one embodiment the present invention. For example, the system 600 may be implemented as a part of the systems shown in FIG. 1. Note that while FIG. 6 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 6, the computer system 601, which is a form of a data processing system, includes a bus 603 which is coupled to a microprocessor(s) 605 and a ROM (Read Only Memory) 607 and volatile RAM 609 and a non-volatile memory 611. The microprocessor 603 may retrieve the instructions from the memories 607, 609, 611 and execute the instructions to perform operations described above. The bus 603 interconnects these various components together and also interconnects these components 605, 607, 609, and 611 to a display controller and display device 613 and to peripheral devices such as input/output (I/O) devices which may be mice, keyboards, modems, network interfaces, printers and other devices which are well known in the art. Typically, the input/output devices 615 are coupled to the system through input/output controllers 617. The volatile RAM (Random Access Memory) 609 is typically implemented as dynamic RAM (DRAM) which requires power continually in order to refresh or maintain the data in the memory.

The mass storage 611 is typically a magnetic hard drive or a magnetic optical drive or an optical drive or a DVD RAM or a flash memory or other types of memory systems which maintain data (e.g. large amounts of data) even after power is removed from the system. Typically, the mass storage 611 will also be a random access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 603 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:
1. A computer implemented method comprising:
 presenting a list of graphic elements representing a hierarchical relationships of files stored in a device remotely coupled to a backup service for the device, each graphic element corresponding to one or more of the files, the device storing a cart data specifying a file collection among the files, the file collection to be backed up to the backup service, the graphic elements displayed at a foreground of a display device;

activating an application to perform processing operations that are unassociated with data backup operations on corresponding one or more files of one of the graphic elements, the application presenting a user interface at the foreground for the processing operations;

initiating regular backup operations to copy at least one file specified in a data set according to a backup schedule, wherein the device is associated with the data set and the backup schedule, the data set specifying at least one of the files stored in the device;

in response to receiving, while the application is still activated for the processing operations, a first user input selecting the one graphic element, presenting a list of interface items at the foreground, the list having one or more edit items to update the file collection of the cart data, the edit item including a first item;

in response to receiving a second user input on the first item, adding the corresponding files of the selected graphic element to the file collection of the cart data while the application is still activated for the processing operations;

in response to receiving a third user input subsequent to the second user input, presenting the user interface of the application at the foreground to continue the processing operations; and in response to receiving a fourth user input subsequent to the third user input, initiating on demand backup operations to copy one or more files specified in the file collection to the backup service while the application is still activated for the processing operations, wherein the on demand backup operations are initiated independent of the regular backup operations and while the regular backup operations are running.

2. The method of claim 1,
wherein the file collection of the cart data includes files added during different sessions of a browsing application.

3. The method of claim 1, wherein the initiation of the on demand backup operations comprises:
determining if the at least one file of the data set have been copied via the regular back up operations; and
waiting for completion of the regular backup operations if the at least one files of the data set have not been completely copied, wherein the on demand backup operations are not initiated before the completion of the regular backup operations.

4. The method of claim 1, wherein the graphics elements are presented via a file browsing application, further comprising:
in response to receiving a fifth user input prior to the third user input, closing the browsing application, wherein the graphics elements are not presented in the display after the browsing application is closed.

5. The method of claim 4, wherein the backup service includes a configuration server, further comprising:
configuring the device remotely from the configuration server for the on demand backup operations.

6. The method of claim 5, wherein the browsing application is installed in the client during the configuration.

7. The method of claim 5, wherein the device includes the browsing application before the configuration, and where the browsing application is updated with the list of interface options during the configuration.

8. The method of claim 4, further comprising:
in response to receiving a sixth user input prior to the third user input, reactivating the browsing application; and
presenting an updated list of graphic elements representing an updated hierarchical relationships of latest files stored in the device via the reactivated browser application, wherein the latest files include first one or more files corresponding to one of the updated list of graphics elements, and wherein the collection of files for the on demand backup operations include the first one or more files.

9. A non-transient machine-readable storage medium having instructions herein, which when executed by a machine, cause the machine to perform operations, the operations comprising:
presenting a list of graphic elements representing a hierarchical relationships of files stored in a device remotely coupled to a backup service for the device, each graphic element corresponding to one or more of the files, the device storing a cart data specifying a file collection among the files, the file collection to be backed up to the backup service, the graphic elements displayed at a foreground of a display device;

activating an application to perform processing operations that are unassociated with data backup operations on corresponding one or more files of one of the graphic elements, the application presenting a user interface at the foreground for the processing operations;

initiating regular backup operations to copy at least one file specified in a data set according to a backup schedule, wherein the device is associated with the data set and the backup schedule, the data set specifying at least one of the files stored in the device;

in response to receiving, while the application is still activated for the processing operations, a first user input selecting the one graphic element, presenting a list of interface items at the foreground, the list having one or more edit items to update the file collection of the cart data, the edit item including an first item;

in response to receiving a second user input on the first item, adding the corresponding files of the selected graphic element to the file collection of the cart data while the application is still activated for the processing operations;

in response to receiving a third user input subsequent to the second user input, presenting the user interface of the application at the foreground to continue the processing operations; and in response to receiving a fourth user input subsequent to the third user input, initiating on demand backup operations to copy one or more files specified in the file collection to the backup service while the application is still activated for the processing operations, wherein the on demand backup operations are initiated independent of the regular backup operations and while the regular backup operations are running.

10. The medium of claim 9,
wherein the file collection of the cart data includes files added during different sessions of a browsing application.

11. The medium of claim 9, wherein the backup service includes a configuration server, further comprising:
configuring the device remotely from the configuration server for the on demand backup operations.

12. The medium of claim 9, wherein the display device includes a display area partitioned into at least one application area and one system area, wherein the graphic elements are presented in the application area, wherein the system area includes at least one system tray, wherein the first user input selecting the one graphic element is received via the application area and wherein the fourth user input for the initiation of the on demand backup operations is received via the one system tray.

13. The medium of claim 9, wherein the menus include an activation menu and wherein the fourth user input for the initiation of the on demand backup operations is received via the activation menu.

14. The medium of claim 13, wherein the initiation of the on demand backup operations comprises:
adding the corresponding files of the selected graphic element to the file collection of the cart data to ensure the one or more files copied via the on demand backup operations include the corresponding files of the selected graphic element.

15. The medium of claim 9, wherein the list of graphic elements correspond to a directory structure with the hierarchical relationship for the files, wherein the one graphic element selected corresponds to a directory in the directory structure, the directory including the files corresponding to the one graphic element.

16. The medium of claim 15, wherein the directory structure include a separate directory having at least a separate file corresponding to a separate one of the graphic element, and where the file collection of the cart data include the separate file.

17. A computer system comprising:
a memory storing executable instructions;
a network interface coupled to a backup service;
a display device;
a storage device storing one or more files;
a processor coupled to the memory, the network interface, the storage device and the display device to execute the instructions from the memory, the processor being configured to
present a list of graphic elements representing a hierarchical relationships of the files, each graphic element corresponding to one or more of the files, the device storing a cart data specifying a file collection among the files, the file collection to be backed up to the backup service, the graphic elements displayed at a foreground of the display device,
activate an application to perform processing operations that are unassociated with data backup operations on corresponding one or more files of one of the graphic elements, the application presenting a user interface at the foreground for the processing operations,
initiate regular backup operations to copy at least one file specified in a data set according to a backup schedule, wherein the storage device is associated with the data set and the backup schedule, the data set specifying at least one of the files stored in the storage device,
in response to receiving, while the application is still activated for the processing operations, a first user input selecting the one graphic element, present a drop down menu at the foreground, the drop down menu having one or more edit menu item to update the file collection of the cart data, the edit menu items including a first menu item,
in response to receiving a second user input on the first menu item, add the corresponding files of the selected graphic element to the file collection of the cart data while the application is still activated for the processing operations,
in response to receiving a third user input subsequent to the second user input, present the user interface of the application at the foreground to continue the processing operations, and
in response to receiving a fourth user input subsequent to the third user input, initiate on demand backup operations to copy one or more files specified in the file collection to the backup service while the application is still activated for the processing operations, wherein the on demand backup operations are initiated independent of the regular backup operations and while the regular backup operations are running.

18. The system of claim 17,
wherein the file collection of the cart data includes files added during different sessions of a browsing application.

19. The system of claim 17, wherein the initiation of the on demand backup operations comprises:
determining if the at least one files of the data set have been copied via the regular back up operations; and
waiting for completion of the regular backup operations if the at least one files of the data set have not been completely copied, wherein the on demand backup operations are not initiated before the completion of the regular backup operations.

20. The system of claim 17, wherein the graphics elements are presented via a file browsing application, the processor further configured to:
in response to receiving a fifth user input prior to the third user input, close the browsing application, wherein the graphics elements are not presented in the display after the browsing application is closed.

21. The system of claim 20, the processor further configured to:
in response to receiving a sixth user input prior to the third user input, reactivate the browsing application; and
present an updated list of graphic elements representing an updated hierarchical relationships of latest files stored in the device via the reactivated browser application, wherein the latest files include first one or more files corresponding to one of the updated list of graphics elements, and wherein the collection of files for the on demand backup operations include the first one or more files.

22. The system of claim 20, the processor further configured to:
in response to receiving an seventh user input selecting a first one of the updated list of graphic elements corresponding to the first one or more files, present the list of interface options at the foreground; and
in response to receiving an eighth user input on the first menu, update the cart data to add the first one or more files to the file collection.

23. The system of claim 20, wherein the first user input is based on a user click operation detected via an input/output device locally coupled to the device, wherein the user click operation causes an event received in the browsing application which is activated independent of the backup service.

* * * * *